United States Patent

Berding et al.

[15] 3,689,543
[45] Sept. 5, 1972

[54] PRODUCTION OF ALKALI METAL SALTS OF NITRILOTRIACETIC ACID

[72] Inventors: Christoph Berding, Limburgerhof; Paul Guenthert, Iggelheim; Gerhard Schulz; Waldemar Koehler, both of Ludwigshafen,, Germany

[73] Assignee: Basische Anilin- & Soda-Fabrik Aktiengesellschaft, 3, Ludwigshafen/ Rhine, Land Rhineland-Pfalz, Germany

[22] Filed: Aug. 8, 1969

[21] Appl. No.: 848,694

[52] U.S. Cl. ..........................................260/534 E
[51] Int. Cl. ............................................C07c 101/20
[58] Field of Search ................................260/534 E

[56] References Cited

UNITED STATES PATENTS 2,631,165    3/1953    Ploetz ....................260/534 E 3,419,609    12/1968    Sibert.....................260/534 E

*Primary Examiner*—Lorraine A. Weinberger
*Assistant Examiner*—John F. Terapane
*Attorney*—Johnston, Root, O'Keeffe, Keil, Thompson & Shurtleff

[57]  ABSTRACT

Production of alkali metal salts of nitrilotriacetic acid from an alkali metal cyanide, formaldehyde and ammonia by reaction in at least two stages, the alkali metal cyanide being reacted with formaldehyde in approximately stoichiometric ratio of 50° to 200° C. and 2 to 50 atmospheres gauge in the presence of an excess of ammonia in the first stage and the resultant solution (after decompression to atmospheric pressure) being treated in one or more further stages with further amounts of alkali metal cyanide and formaldehyde at 60° to 110° C. while removing ammonia at the same time.

5 Claims, No Drawings

PRODUCTION OF ALKALI METAL SALTS OF NITRILOTRIACETIC ACID

It is known that alkali metal salts of nitrilotriacetic acid, for example the trisodium salt, can be prepared by condensation of ammonia with an alkali metal cyanide and formaldehyde with simultaneous alkaline hydrolysis of the nitrile group. For this purpose ammonia is combined with the alkali metal cyanide or with stoichiometric amounts of alkali metal hydroxide and hydrocyanic acid in aqueous alkaline solution and formaldehyde is slowly metered in. Not only is nitrilotriacetic acid formed but also incompletely carboxymethylated compounds (iminodiacetic acid and aminoacetic acid) and other substances, for example hexamethylenetetramine, glycolic acid and formic acid, depending on the reaction conditions chosen.

In the prior art embodiments of this process there are many disadvantages and in all cases either the proportion of byproducts obtained is too high or the rate of reaction and thus the space-time yields are too low.

We have now found surprisingly that alkali metal salts of nitrilotriacetic acid can be prepared with good yields and in high purity from an alkali metal cyanide, formaldehyde and ammonia in a simple way by carrying out the reaction in at least two stages, the alkali metal cyanide being reacted in the first stage with formaldehyde in stoichiometric or substantially stoichiometric ratio at temperatures of 50° to 200° C. and pressures of about 2 to 50 atmospheres gauge in the presence of an excess of ammonia to form a solution containing mainly aminoacetic acid and the resultant solution is decompressed at atmospheric pressure and treated in one or more than one further stage with further amounts of the alkali metal cyanide and formaldehyde at temperatures of 60° to 110° C. while removing ammonia to convert aminoacetic acid and iminodiacetic acid into nitrilotriacetic acid.

The different reaction steps can be carried out in one reactor, but they are advantageously carried out in at least two and preferably three separate vessels.

A pressure vessel is used as the reactor for the first stage. Formaldehyde and alkali metal cyanide are reacted therein in stoichiometric or substantially stoichiometric ratio with an excess of ammonia (about 1 mole to 10 moles per mole of alkali metal cyanide) at a pressure of from 2 to 50, advantageously from 6 to 25, atmospheres gauge and at a temperature within the range of from 50° to 200° C., preferably from 100° to 130° C.

The formaldehyde is advantageously used as a commercial 20 to 40 percent aqueous solution and the alkali metal cyanide used may be potassium cyanide or, because of its lower price, advantageously sodium cyanide. Although the alkali metal cyanide may be added in solid form, it is advisable to use an aqueous solution of an alkali metal cyanide because the latter is easier to meter. It is also possible to use technical alkali metal cyanide solutions having a slight excess of alkali. The excess of alkali in these solutions is not detrimental but in contrast to the prior art methods it is not essential.

As the reaction solution leaves the reactor of the first stage, it is expanded to atmospheric pressure. The reaction solution is then kept at a temperature of from 60° to 110° C., preferably from 75° to 95° C., in one or more further reactors with a further addition of formaldehyde and alkali metal cyanide and with the removal of ammonia contained in solution or newly formed, for example by blowing in nitrogen or steam. The reaction at atmospheric pressure is carried out in one reactor or preferably in more than one reactor, particularly in two separate reactors. For example a stirred vessel may be used following the first stage, nitrogen being blown in and formaldehyde and alkali metal cyanide metered in separately or after having been mixed, in an amount which depends on the degree of reaction achieved in the first stage, i. e. the content of mono- and disubstitution products. As a rule the amount of formaldehyde and alkali metal cyanide added in the second stage is from 20 to 66 percent of the total amount required.

Since conversion into nitrilotriacetic acid is incomplete when the reaction is carried out at atmospheric pressure in a single stirred vessel, it is advantageous to use more than one stage. The reactor for the second stage may be for example a packed column or a bubble tray column in which steam flows countercurrent to the reaction solution for complete expulsion of the residual ammonia and in which a small amount, for example from 2 to 10 percent of the total amount of formaldehyde and alkali metal cyanide, is added to complete the reaction of residual intermediates to nitrilotriacetic acid. The reaction temperature in this column is also as a rule from 60° to 110° C.

The reaction stages following the stage operated at superatmospheric pressure may also be carried out in one apparatus by using a column having a high hold-up, for example a bubble tray column, into which formaldehyde and alkali metal cyanide can be introduced at one or more points.

The process according to the invention gives a product of good and consistent quality which can be used for commercial purposes without purification or aftertreatment. The space time yields of this process are far above those of the method carried out wholly at atmospheric pressure. In particular, the intermediates are converted almost completely into the desired end product. When apparatus having the same effective capacity is used, the output is more than three times higher than in the conventional method. The alkali metal salt of nitrilotriacetic acid can be recovered from the aqueous solution by evaporation or spraydrying as the monohydrate in high purity (more than 98 percent), 92 percent by weight being salt devoid of water of hydration and 6 percent by weight water of hydration.

The invention is illustrated by the following Example. The parts and percentages given in the Example are by weight.

EXAMPLE 175 parts of a 28 percent solution of sodium cyanide is placed in a stirred pressure vessel and heated to 85° C. Then ammonia is pressured in at a pressure of 20 atmospheres gauge. 85 parts of a 36 percent formaldehyde solution is added uniformly in the course of 3 hours while maintaining the reaction temperature and pressure. After the formaldehyde solution has been added, the reaction mixture is allowed to flow from the pressure vessel through an expansion valve into a stirred vessel which is at atmospheric pressure and the ammonia thus expelled is withdrawn through a reflux condenser. Another 87.5 parts of the sodium cyanide solution is added to this stirred vessel and in the course of 3 hours 42.5 parts of the formaldehyde solution is metered in uniformly. The reaction temperature in this second stage is also 85° C. Ammonia liberated during the reaction escapes through the reflux condenser.

When all the formaldehyde solution has been added in the second reaction stage, the reaction mixture is substantially freed from ammonia by blowing air through. At the same time however 13.1 parts of sodium cyanide solution and 6.4 parts of formaldehyde solution are added in the course of about 20 minutes. The reaction temperature is kept at 85° C.

362 parts of product solution is obtained with a content of 35.0 percent of the trisodium salt of nitrilotriacetic acid. The yield is 93.5 percent of the theory. In addition the solution contains 1.0 percent of the disodium salt of iminodiacetic acid and 0.3 percent of the sodium salt of aminoacetic acid, about 0.1 percent of formaldehyde and less than 0.001 percent of sodium cyanide.

If the solution is evaporated to dryness, a powder is obtained which contains 91 percent of the trisodium salt of nitrilotriacetic acid with 2 percent moisture.

The space time yield is 1.5 kg of product (calculated 100 percent per liter of reaction space per day.

We claim:

1. A batch process for the production of alkali metal salts of nitrilotriacetic acid from an alkali metal cyanide, formaldehyde and ammonia, wherein the reaction is carried out in at least two discontinuous stages, the alkali metal cyanide being reacted with formaldehyde in stoichiometric or substantially stoichiometric ratio at a temperature of from 50° to 200° C. and a pressure of from 2 to 50 atmospheres gauge in the presence of an excess of ammonia in a first stage to form a solution containing mainly aminoacetic acid, decompressing the resultant solution to atmospheric pressure and treating the solution in one or more than one further stage with further amounts of alkali cyanide and formaldehyde at a temperature of from 60° to 110° C. while at the same time removing ammonia, to convert aminoacetic acid and imino-diacetic acid into nitrilotriacetic acid.

2. A process as claimed in claim 1 wherein the pressure in the first stage is from 6 to 25 atmospheres gauge.

3. A process as claimed in claim 1 wherein the temperature in the first stage is from 100° to 130° C.

4. A process as claimed in claim 1 wherein the formaldehyde is used in the form of a commercial 20 to 40 percent aqueous solution.

5. A process as claimed in claim 1 wherein the temperature in the second and any subsequent stage is from 75° to 95° C.

* * * * *